(12) United States Patent
Uebelacker et al.

(10) Patent No.: US 10,773,485 B2
(45) Date of Patent: Sep. 15, 2020

(54) COMPOSITE GLASS PANE WITH A MOUNTING HOLE

(71) Applicant: SAINT-GOBAIN GLASS FRANCE, Courbevoie (FR)

(72) Inventors: Stefan Uebelacker, Aachen (DE); Rolf Koette, Alsdorf (DE); Wolfgang Von Avenarius, Herzogenrath (DE); Gerry R. Parij, Warren, MI (US)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 140 days.

(21) Appl. No.: 15/736,282

(22) PCT Filed: Feb. 17, 2016

(86) PCT No.: PCT/EP2016/053337
§ 371 (c)(1),
(2) Date: Dec. 13, 2017

(87) PCT Pub. No.: WO2017/084767
PCT Pub. Date: May 26, 2017

(65) Prior Publication Data
US 2018/0178482 A1    Jun. 28, 2018

Related U.S. Application Data

(60) Provisional application No. 62/256,658, filed on Nov. 17, 2015.

(51) Int. Cl.
*B32B 15/04*         (2006.01)
*B32B 17/06*         (2006.01)
(Continued)

(52) U.S. Cl.
CPC ........ *B32B 3/266* (2013.01); *B29C 45/14344* (2013.01); *B29C 45/14434* (2013.01);
(Continued)

(58) Field of Classification Search
USPC ................................ 428/426, 428, 432, 688
See application file for complete search history.

(56) References Cited

U.S. PATENT DOCUMENTS 5,138,804 A      8/1992 Roberts
5,398,452 A *    3/1995 Schilde ............ B32B 17/10036
                                                          49/404

(Continued)

FOREIGN PATENT DOCUMENTS

CN     104476855 A    4/2015
DE     4130823 A1     3/1993
(Continued)

OTHER PUBLICATIONS

English Translation of Korean Office Action for App. 2018700333. 7 Pages (English Translation Only).
(Continued)

*Primary Examiner* — Lauren R Colgan
(74) *Attorney, Agent, or Firm* — Pillsbury Winthrop Shaw Pittman LLP

(57) ABSTRACT

A composite glass pane with a through mounting hole. The composite glass pane having a first pane and a second pane that are bonded to one another via a thermoplastic intermediate layer and at least one passage that extends through the entire composite glass pane, wherein the edge of the passage is provided with a polymeric element formed in one piece having a through hole running through the passage.

17 Claims, 3 Drawing Sheets

Figure 1:
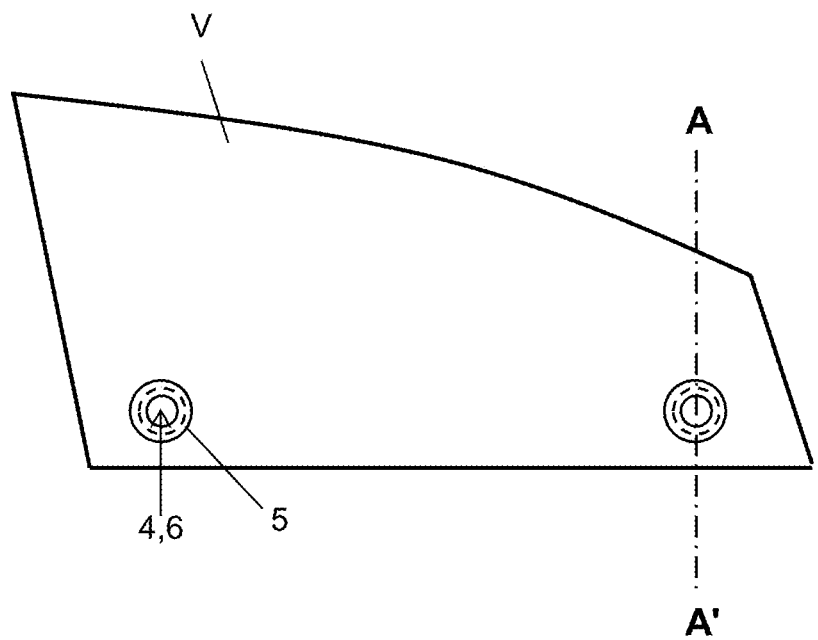

(51) Int. Cl.

| | | |
|---|---|---|
| *B32B 3/26* | (2006.01) | |
| *B29C 45/14* | (2006.01) | |
| *B60J 1/17* | (2006.01) | |
| *E05F 11/38* | (2006.01) | |
| *B32B 17/10* | (2006.01) | |
| *E06B 3/66* | (2006.01) | |
| *E06B 3/673* | (2006.01) | |
| *B29K 67/00* | (2006.01) | |
| *B29K 77/00* | (2006.01) | |
| *B29K 709/08* | (2006.01) | |
| *B29L 31/30* | (2006.01) | |

(52) U.S. Cl.
CPC .. *B32B 17/10036* (2013.01); *B32B 17/10293* (2013.01); *B60J 1/17* (2013.01); *E05F 11/385* (2013.01); *E06B 3/66* (2013.01); *E06B 3/673* (2013.01); *B29K 2067/006* (2013.01); *B29K 2077/00* (2013.01); *B29K 2709/08* (2013.01); *B29L 2031/3052* (2013.01); *B32B 17/10761* (2013.01); *B32B 2605/006* (2013.01); *E05F 2011/387* (2013.01); *E05Y 2900/55* (2013.01)

(56) References Cited

U.S. PATENT DOCUMENTS

| | | | |
|---|---|---|---|
| 5,787,662 | A | 8/1998 | Danz |
| 6,261,672 | B1 * | 7/2001 | de Paoli .................... B32B 3/08 428/213 |
| 8,088,472 | B2 | 1/2012 | Manneheim Astete et al. |
| 2004/0221526 | A1 | 11/2004 | Rinehart et al. |
| 2007/0125014 | A1 | 6/2007 | Eckelt et al. |
| 2008/0092464 | A1 | 4/2008 | Haab et al. |

FOREIGN PATENT DOCUMENTS

| | | |
|---|---|---|
| DE | 4223694 A1 | 1/1994 |
| DE | 4311442 C1 | 7/1994 |
| DE | 19909088 A1 | 9/2000 |
| DE | 20107806 U1 | 2/2002 |
| DE | 102004003960 A1 | 8/2005 |
| EP | 0 619 435 B1 | 10/1994 |
| JP | H05214876 A | 8/1993 |
| JP | H06323321 A | 11/1994 |
| JP | H07509031 A | 10/1995 |
| JP | H11236253 A | 8/1999 |
| JP | 2005239806 A | 9/2005 |
| JP | 2005320214 A | 11/2005 |
| JP | 2007519597 A | 7/2007 |
| JP | 2009173860 A | 8/2009 |
| KR | 10-0287311 B1 | 4/2001 |
| KR | 10-2015-0068385 A | 6/2015 |
| WO | WO 00/064670 A1 | 11/2000 |

OTHER PUBLICATIONS

International Search Report for International Application No. PCT/EP2016/053337 filed Feb. 17, 2016 on behalf of Saint-Gobain Glass France, dated Jul. 15, 2016. 7 pages. (German + English Translation).

Written Opinion for PCT Application No. PCT/EP2016/053337 filed on Feb. 16, 2016 on behalf of Saint-Gobain Glass France, dated Jul. 15, 2016. 13 pages. (English translation + German original).

Office Action as issued in Chinese Patent Application No. 201680002207.X, dated Apr. 9, 2020.

* cited by examiner

A – A'

A – A'

A – A'

COMPOSITE GLASS PANE WITH A MOUNTING HOLE

CROSS REFERENCE TO RELATED APPLICATIONS

The present application is the U.S. national stage entry of International Patent Application No. PCT/EP2016/053337, filed internationally on Feb. 17, 2016, which, in turn, claims priority to U.S. Provisional Patent Application No. 62/256,658, filed on Nov. 17, 2015.

The invention relates to a composite glass pane with a mounting hole, a method for its production, as well as the use of a polymeric element in such a composite glass pane.

Motor vehicles typically have openable side windows. Such side windows are provided with a side pane that can be moved by substantially vertical displacement, by which means the side window can be opened and closed. In order to be able to move the window, it is connected to a mechanism in the interior of the motor vehicle body.

Side windows of motor vehicles are usually implemented as single pane safety glass (SPSG), are thus made from a single, thermally prestressed glass pane. These side windows are typically equipped with one or a plurality of holes in the vicinity of the lower edge, which serve for connection to the displacement mechanism. Such holes are quite simple to produce in an SPSG pane and enable a simple and very stable installation.

However, side windows are also increasingly common that are formed from composite safety glass (CSG), in particular for motor vehicles of higher price ranges. These side windows are made from two non-prestressed glass panes that are bonded to one another by means of lamination via a thermoplastic intermediate layer (typically a PVB film). These side panes have a lower weight than SPSG side panes and improve acoustic comfort in the motor vehicle as well as break-in security. Since CSG panes with holes are more difficult to produce and are less stable than is the case with SPSG panes, CSG side panes are conventionally connected to the displacement mechanism by other means: a mounting bracket is clamped or glued onto the lower edge.

Since the mounting of the side pane on the displacement mechanism by means of a hole is preferable, there is demand for laminated side panes with mounting holes. Here, there exists in particular the problem of positioning the holes in the two individual panes exactly one above the other. Frequently, a certain offset between the holes appears which is also not absolutely constant within a production series. This renders the installation of mounting brackets or attachment parts in the hole more difficult.

US 2008/0092464 A1 discloses a composite glass pane with a mounting recess, into which rotatable components each with an eccentrically arranged hole are introduced from both sides. By rotating the components against each other, the holes can be made to coincide such that, independent of any offset of the glass panes, a mounting hole of reproducible shape and size results. However, the mounting system according to US 2008/0092464 A1 is complicated and error-prone due to its multipart design.

The object of the present invention is to provide an improved composite glass pane with a mounting hole that enables the mounting of attachment parts, mounting devices, or the like despite a possible offset of the glass panes and that is simple to produce.

The object of the present invention is accomplished according to the invention by a composite glass pane in accordance with this disclosure. Preferred embodiments are also disclosed.

The composite glass pane according to the invention comprises at least one first pane and a second pane that are bonded to one another via a thermoplastic intermediate layer. The composite pane according to the invention has at least one passage. The passage extends through the entire composite glass pane, i.e., through the first pane, the intermediate layer, and the second pane.

The composite glass pane is preferably provided to separate an interior space from an external environment. The composite glass pane is, in a preferred embodiment, a motor vehicle window pane, i.e., separates a vehicle interior from the external environment. The two panes can, consequently, also be referred to as the outer pane and inner pane. The term "inner pane" refers to the pane that faces the interior in the installed position. The term "outer pane" refers to the pane that faces the external environment in the installed position.

In order to form the passage, the first pane, the second pane, and the intermediate layer have a hole. Said holes overlap one another completely or at least partially such that the passage is formed by the overlapping regions of the holes.

Ideally, the holes in the panes and preferably also in the intermediate layer have the same size. However, in the production of such a composite glazing, it is difficult to position the holes completely exactly one over another such that an offset between the edges of the holes can occur. This problem occurs particularly with curved composite glass panes as are common in the motor vehicle sector, since the bending of the panes results in further problems in the overlapping of the holes. Such an offset can cause problems in the intended use of the passage. Typically, an attachment part or a component is mounted in the passage, for example, a mounting device or a mechanism that holds and moves the pane. A usually unintended and non-reproducibly occurring offset can interfere with the mounting since the passage, which results as it were as the overlapping of the holes, is not exactly identical and constant within the production series.

In order to compensate a possible offset, the composite glass pane is outfitted according to the invention with a polymeric element formed in one piece. The edge of the passage is provided with the compensation element. The compensation element does not completely close the passage, but, instead, also has, for its part, a passage or a through hole or forms such a through hole. This hole of the polymeric element runs through the passage of the composite glass pane, is thus arranged inside the passage of the composite glass pane. The compensation element ensures that each composite glass pane in a production series has a mounting hole of the same size, since the size and shape of the mounting hole are defined by the through hole in the polymeric element. A possibly occurring offset between the glass panes plays no role, it is compensated by the polymeric element. The polymeric element can, consequently, also be referred to as a compensation element. By means of the one-piece design of the compensation element, the compensation element is very robust, the connection to the pane is very stable, and production is comparatively simple. These are major advantages of the invention.

The polymeric element it is provided for and suitable for compensating a possible offset between the panes. The polymeric element is further provided for and suitable for mounting an attachment part or mounting element on the pane, in particular through introduction of a mounting section, for example, a mounting pin, in the hole of the polymeric element. The polymeric element is further provided for and suitable for feeding forces acting on the composite glass pane from the attachment part or mounting element affixed on the pane in a controlled manner into the composite glass pane, preferably distributing them to the individual panes.

In the context of the invention, the edge of the passage is the edge of the composite glass pane arranged inside the passage that delimits the passage, consisting of the corresponding side edges of the two panes and of the intermediate layer. The compensation element is arranged on a portion of the edge or on the entire edge of the passage. The compensation element can be in direct contact with this portion of the edge or with the entire edge of the passage or can be bonded thereto via an adhesion promoter or an adhesive.

The compensation element is arranged completely inside the surface of the composite glass pane. This means that the compensation element does not protrude beyond the side edges delimiting the composite glass pane. It is limited to the passage and possibly to a region of the composite glass pane surrounding it and differs fundamentally from polymeric mounting elements that are affixed in the region of a side edge and protrude therebeyond in order to provide a mounting capability in the protruding region.

The offset between the holes in the first and the second pane is, for example, as much as 5 mm or as much as 2 mm. The invention is, of course, particularly advantageous when an offset greater than 0 mm, for example, greater than 0.1 mm, occurs, whereas, in the context of mass production, even those panes that have, as a result of production variation, no offset would, however, be provided with a compensation element. The offset can, for example, be from 0.1 mm to 5 mm or from 0.1 mm to 2 mm.

The holes in the first and the second pane can have the same size. Alternatively, it is however also possible for the holes to have different sizes. Thus, it can be simpler, for example, with regard to the positioning of the panes during production, to arrange a smaller hole inside the area of a larger hole and to compensate the size difference that occurs by means of the compensation element according to the invention.

The size of the passage in the composite glass pane and the size of the hole in the compensation element are governed by the requirements in the individual case. Typically, the size of the passage and the hole is in the range from 5 mm to 100 mm, usually from 10 mm to 30 mm. These are typical sizes for mounting holes. Naturally, the size of the hole in the compensation element is smaller than the size of the passage of the composite glass pane, since the compensation element is arranged inside this passage. The size of the hole in the compensation element it is preferably from 50% to 90% of the size of the passage, particularly preferably from 60% to 80%. Thus, an offset between the panes can be effectively compensated, a stable connection point for attachment parts is provided, but the mounting hole is not excessively reduced such that a connection with the attachment part is possible with no problems.

The hole in the mounting element is preferably substantially circular, for which most conventional mounting systems or attachment parts are designed. However, depending on the requirements in the individual case, the hole can have any other shape, for example, an elliptical shape or even an irregular shape.

In a preferred embodiment, the polymeric element is formed by injection molding in the passage, completely covers the edge of the passage, and makes contact with the entire edge. Typically, the polymeric element also covers, in addition to the edge of the passage, a region of the surfaces of the first and second pane facing away from one another (outer surfaces of the composite glass pane), which region borders and encircles the passage. The polymeric element is molded directly onto the composite glass pane. Such a compensation element is very robust and stable and less error-prone than, for example, compensation elements that are formed in two pieces, inserted into the passage from both sides, and connected to one another there, for instance, by a thread or click connection.

The material thickness of the injection molded compensation element, measured perpendicular to the edge of the passage and, optionally, preferably also measured in the encircling region of the outer surfaces perpendicular thereto, is preferably from 1 mm to 10 mm, particularly preferably from 1.5 mm to 5 mm, in particular from 1.5 mm to 3 mm. The encircling region of the outer surfaces of the composite glass pane around the passage, which is covered by the compensation element, preferably has a width from 2 mm to 20 mm, particularly preferably from 3 mm to 10 mm, in particular from 3 mm to 5 mm. Thus, a very stable connection of the composite glass pane and the compensation element it is obtained. Whereas the width should be at least 2 mm or 3 mm to ensure adequate stability, the upper limit is, in principle, technically only defined by the pane edge and is otherwise subject to no restrictions, with an excessive width driving up the material costs of the compensation element.

In another embodiment, the polymeric element is a tolerance ring. Tolerance rings are known per se to the person skilled in the art. They are strips with a profiled surface design whose ends are brought together in a ringlike manner and thus form a hole. Tolerance rings serve mostly as frictionally engaged connection elements used in particular in mechanical engineering. There, they are manufactured, for example, from spring steel. The inventors have found that a polymeric tolerance ring can be used to form the hole according to the invention and to compensate the offset of the holes in the glass panes without being accompanied by the risk of damage to the composite glass pane.

The material thickness of the tolerance ring is preferably from 1 mm to 5 mm, particularly preferably from 1 mm to 2 mm.

The polymeric compensation element preferably contains at least one thermoplastic polymer. The polymer can be reinforced with glass fibers or glass beads, in order to have thermal expansion similar to the glass panes. Preferred materials are, in particular, polyamide or polybutylene terephthalate; however, polyethylene, polypropylene, polystyrene, polyoxymethylene, polycarbonate, polymethylmethacrylate, polyester, polyvinylchloride, polysulfone, polyethersulfone, polyether ketone, or polytetrafluoroethylene can also be used. Mixtures or copolymers can also be used. In an advantageous improvement of the invention, the compensation element contains at least one thermoplastic elastomer, by means of which even relatively small deviations of the pane arrangement, for example, angular deviations, can be compensated. Particularly preferably, the compensation element is made from one of the materials mentioned.

The composite glass pane according to the invention can be flat or curved in one or a plurality of spatial directions. The compensation element according to the invention is particularly advantageous with curved composite glass panes since, there, it is, in particular, difficult to overlap the holes in the individual panes without offset. The composite glass pane is preferably a motor vehicle pane, in particular a pane of a passenger car, which is typically curved.

In an advantageous embodiment, the composite glass pane according to the invention is an openable side window pane of a motor vehicle, in particular of a passenger car. This means a pane for a side window that can be opened by substantially vertical displacement of the side window pane into the car body and closed again. Typically, such side panes have a plurality of passages, in particular, two. The passage or passages are arranged in the region of the lower edge (oriented toward the ground) in the installed position, where they are concealed in the vehicle body in the opened state and also in the closed state of the window. The hole in the compensation element is provided for connecting to a lifting mechanism arranged in the motor vehicle body, in order to mount the pane, in particular by introducing a mounting section of the lifting mechanism, for example, a mounting pin, into the hole. Thus, expensive brackets installed on the lower edge of the side pane, which have previously been prevalent for laminated side panes, can be dispensed with.

The invention also includes the arrangement composed of a motor vehicle body with a lifting mechanism arranged therein for an openable side window and a composite glass pane according to the invention as a side window pane, wherein a connection element of the lifting mechanism is arranged in the hole in the compensation element in order to connect to the side window pane to the lifting mechanism.

The composite glass pane according to the invention can, however, also be provided for other areas of application. The hole can serve to mount attachment parts on the composite glass pane. For example, the composite glass can be a vehicle roof panel, wherein an antenna is installed in the hole. The composite class can, however, also be a transparent heater, wherein holes are provided for attachment to the wall.

The first pane and the second pane preferably contain glass, in particular soda lime glass. In principle, one of the panes or even both panes can also contain rigid plastics, in particular polycarbonate or polymethylmethacrylate. The thickness of the panes can vary widely and thus be eminently adapted to the requirements in the individual case. Preferably, the thicknesses of the first and the second pane are from 0.5 mm to 10 mm and preferably from 1 mm to 5 mm, most particularly preferably from 1.4 mm to 3 mm.

The first pane, the second pane, or the intermediate layer can be clear and colorless, but also tinted, clouded, or colored. The first and the second pane can be made of non-prestressed, partially prestressed, or prestressed glass.

The thermoplastic intermediate layer is formed by at least a thermoplastic bonding film. The thermoplastic bonding film contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic bonding film is preferably from 0.2 mm to 2 mm, particularly preferably from 0.3 mm to 1 mm, for example, 0.38 mm or 0.76 mm.

The invention also includes a method for producing a composite glass pane with a through mounting hole, wherein:

(a) a first pane and a second pane are each provided with at least one hole, (b) the first pane, a thermoplastic intermediate layer, and the second pane are arranged areally in this order one over another, wherein said holes overlap, (c) the first pane is bonded to the second pane via the intermediate layer by lamination, wherein the composite glass pane is created and wherein a through passage is formed from said holes and a hole in the intermediate layer, (d) the edge of the passage is provided with a polymeric element formed in one piece, which has a through hole running through the passage.

The hole in the thermoplastic intermediate layer can be formed before process step (b). Then, in process step (b), the holes of the panes and the hole of the intermediate layer are arranged overlappingly. The composite glass can, however, also be laminated without a hole in the thermoplastic intermediate layer and, subsequently, the hole in the intermediate layer can be produced, creating the passage.

The holes in the individual panes are produced by drilling or by other methods known per se to the person skilled in the art. The hole in the intermediate layer is preferably produced by cutting or punching.

If the composite glass is to be bent, the individual panes are preferably bent before lamination, with all bending methods customary in the art being suitable. The bending occurs preferably only after the production of the holes in the individual panes, since flat panes are simpler to provide with holes.

In a preferred embodiment, in step (d), the region of the composite glass pane is arranged with the passage between two injection molds and the polymeric element is molded directly onto the edge and, optionally, onto a region of the outer surfaces of the composite glass pane surrounding and encircling the passage. For better adhesion, the composite glass pane can be pretreated with a primer or an adhesion promoter.

In an alternative embodiment, in step (d), a polymeric tolerance ring, which forms the hole according to the invention, is inserted into the passage.

The production of the composite glass by lamination is done with customary methods known per se to the person skilled in the art, for example, autoclave methods, vacuum bag methods, vacuum ring methods, calender methods, vacuum laminators, or combinations thereof. The bonding of the first and the second pane is customarily done under the action of heat, vacuum, and/or pressure.

The invention also includes the use of a polymeric element formed in one piece in a passage of a composite glass pane for compensation of any offset of the panes of the composite glass pane.

The invention also includes, in particular, the use of the composite glass pane according to the invention as an openable side window pane of a motor vehicle, wherein the hole in the compensation element serves for mounting on a lifting mechanism in the motor vehicle body.

In the following, the invention is explained in detail with reference to drawings and exemplary embodiments. The drawings are schematic representations and not true to scale. The drawings in no way restrict the invention.

Figure 2:
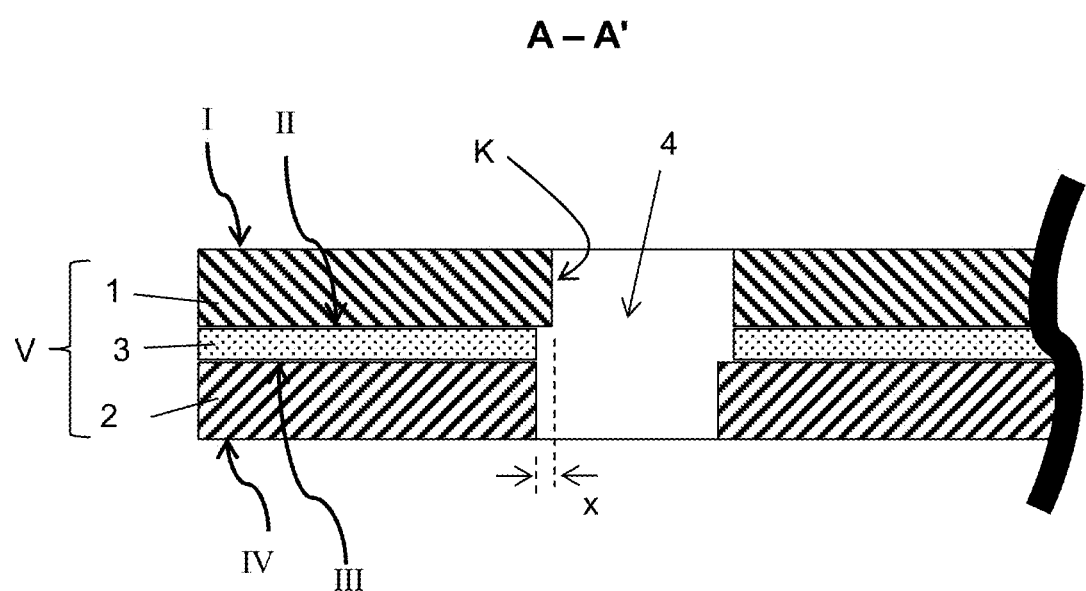
Figure 3:
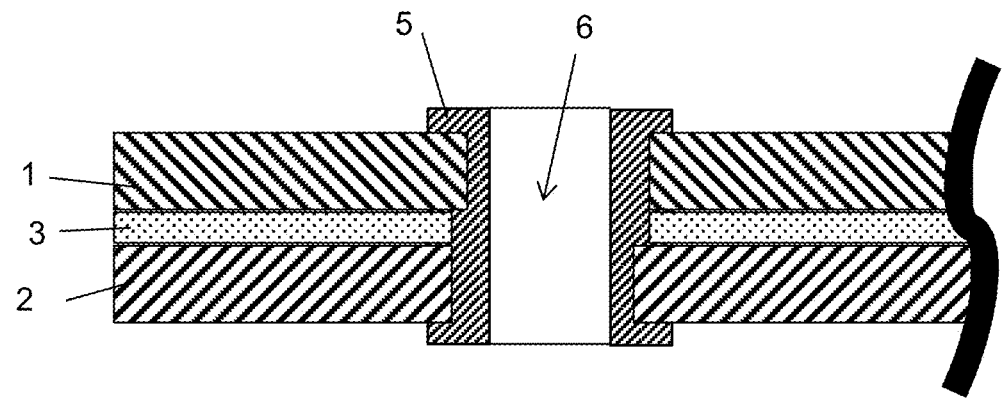
Figure 4:
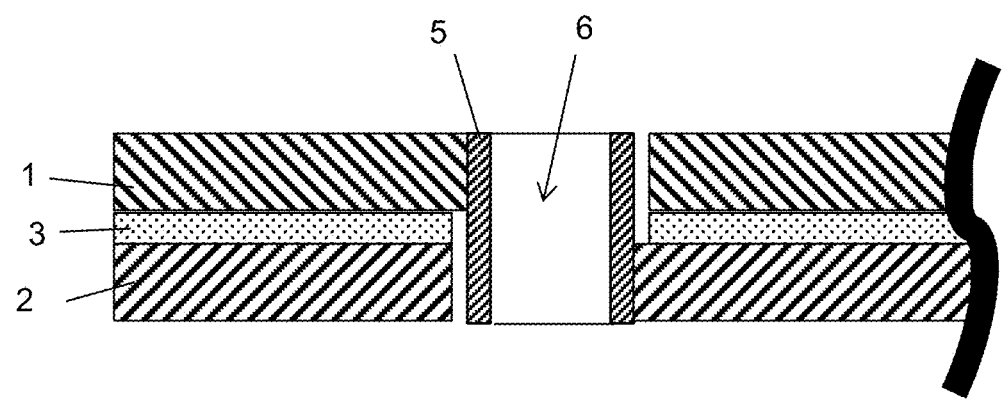
Figure 5:
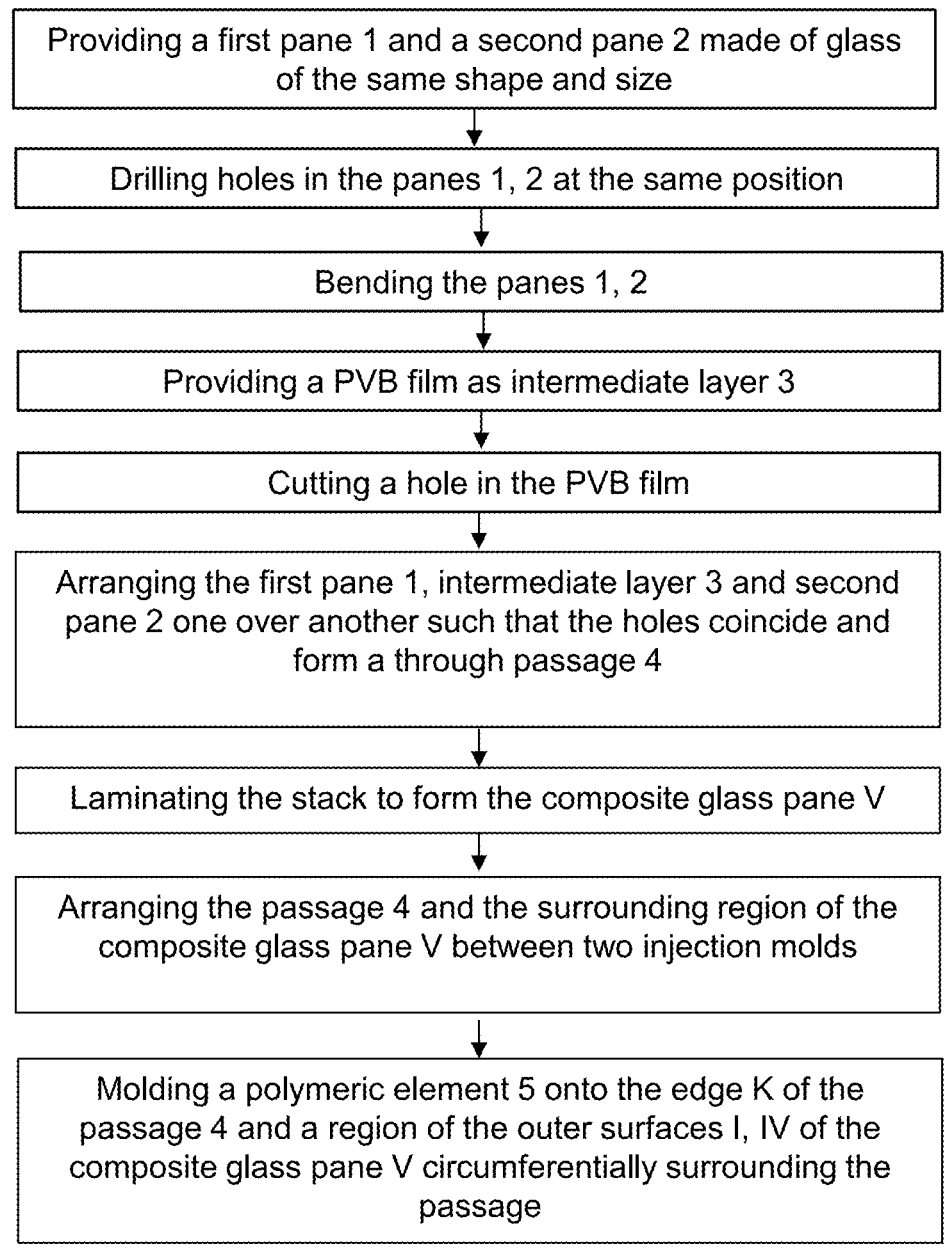

They depict:

FIG. 1 a plan view of an embodiment of the composite glass pane according to the invention, FIG. 2 a section along A-A' through a prior art composite glass pane, FIG. 3 a section along A-A' through the composite glass pane of FIG. 1, FIG. 4 a section along A-A' through another embodiment of the composite glass pane according to the invention, FIG. 5 a flowchart of an embodiment of the method according to the invention.

FIG. 1 depicts a plan view of a composite glass pane V that is implemented as an openable side window pane of a passenger car. The composite glass pane V is provided as a side window pane for the front side window of a passenger car, which can be opened by lowering the side window pane. The composite glass pane V has, in the vicinity of the lower edge, two mounting holes that are provided for connecting the composite glass pane V to a lifting mechanism in a motor vehicle body. A mounting bracket of the lifting mechanism can be guided through the mounting holes and mounted such that the pane is securely connected to the lifting mechanism. The mounting holes are formed by passages 4 in the composite glass pane V, into which a polymeric element 5 is inserted, which has a through hole 6 that runs through the passage 4. The edges of the passage 4 are provided with the polymeric element 5, without the passage 4 being completely closed.

FIG. 2 depicts a cross-section through a prior art composite glass pane V without a polymeric element 5. The composite glass pane V is made up of a first pane 1 and a second pane 2, bonded by a thermoplastic intermediate layer 3. The two panes 1, 2 are made, for example, of soda lime glass and have, in each case, a thickness of 2.1 mm. The intermediate layer 3 is formed, for example, by a PVB film with a thickness of 0.76 mm. Each pane 1, 2 as well as the intermediate layer 3 has a hole, by superpositioning of which the passage 4 is formed. Due to production-technology-related tolerances and/or the typical curvature (not shown) of the composite glass pane V, the holes in the panes 1, 2 do not perfectly coincide, but, instead, have an offset x. This offset x results in the fact that the effective size of the passage 4 is reduced and that the exact shape of the passage 4 is not constant within a production series. This can result in the fact that the intended mounting of the lifting mechanism in the passage 4 is rendered difficult or, in the worst case, is not even possible.

The first pane 1 is provided as an outer pane, the second pane 2 as an inner pane. The surfaces II, III facing one another of the panes 1, 2 are bonded to one another via the intermediate layer 3; the surfaces I, IV facing away from one another of the panes 1, 2 form the outer surfaces of the composite glass pane V.

FIG. 3 depicts a cross-section through the embodiment according to the invention of FIG. 1. The polymeric element 5 covers the edge K of the passage 4 as well as a region of the outer surfaces I, IV of the composite glass pane V, which circumferentially surrounds the passage with a width of 5 mm. The material thickness of the polymeric element 5 is, for example, 3 mm. The polymeric element 5 is molded, by means of an injection molding process, directly onto the composite glass pane V. It is made, for example, of polyamide 6.6. The polymeric element has a hole 4 with a diameter of, for example, 1.5 cm, which serves as the actual mounting hole. The offset x is compensated by the polymeric element 5 such that all manufactured panes have a mounting hole of identical size and shape.

FIG. 4 depicts a cross-section through another embodiment of the invention. Here, the polymeric element 5 is a tolerance ring, which is inserted into the passage 4 and forms a hole 6. In this embodiment as well, the offset is advantageously compensated and a smooth mounting hole is created.

FIG. 5 depicts a flowchart of an exemplary embodiment of the method according to the invention for producing a composite glass pane according to the invention of FIG. 1.

LIST OF REFERENCE CHARACTERS (V) composite glass pane
(1) first pane/outer pane
(2) second pane/inner pane
(3) thermoplastic intermediate layer
(4) passage in the composite glass pane V
(5) one-piece polymeric element/compensation element
(6) hole in element 5
(K) edge of the passage 4
(x) offset of first pane 1 and second pane 2
I outer surface of the outer pane 1
II inner surface of the outer pane 1
III outer surface of the inner pane 2
IV inner surface of the inner pane 2
A-A' section line

The invention claimed is:

1. A composite glass pane with a through mounting hole, comprising:
a first pane;
a second pane;
a thermoplastic intermediate layer, bonding the first pane to the second pane; and a passage having an inner surface that extends through the entire composite glass pane,
wherein an edge of the passage includes a polymeric element formed as one piece having a through hole running through the passage, and
wherein the polymeric element is arranged on the entire inner surface of the passage.

2. The composite glass pane according to claim 1, wherein the first pane, the second pane, and the thermoplastic intermediate layer each have a hole and said holes overlap completely or partially, forming the passage in the composite glass pane.

3. The composite glass pane according to claim 2, wherein edges of the holes in the first pane and the second pane have an offset.

4. The composite glass pane according to claim 1, wherein the polymeric element is formed by injection molding in the passage and completely covers the edge of the passage.

5. The composite glass pane according to claim 4, wherein the polymeric element also covers a region of a surface of the first pane and a surface of the second pane, said region bordering and encircling the passage.

6. The composite glass pane according to claim 1, wherein the polymeric element is a tolerance ring.

7. The composite glass pane according to claim 1, wherein the polymeric element contains glass fibers or glass beads.

8. The composite glass pane according to claim 1, wherein the polymeric element contains at least polyamide or polybutylene terephthalate.

9. The composite glass pane according to claim 1, wherein a size of the through hole is from 50% to 90% of the size of the passage.

10. The composite glass pane according to claim 9, wherein the size of the through hole is from 60% to 80%.

11. The composite glass pane according to claim 1, wherein the through hole is circular.

12. The composite glass pane according to claim 1, wherein the composite glass pane is an openable side window pane of a motor vehicle and the through hole is provided for connecting to a lifting mechanism arranged in a motor vehicle body of the motor vehicle.

13. The composite glass pane according to claim 1, wherein the first pane and the second pane contain glass.

14. The composite glass pane according to claim 1, wherein the first pane and the second pane contain a soda lime glass.

15. A method for producing a composite glass pane with a through mounting hole, comprising:

a) providing a first pane, a second pane, and a thermoplastic intermediate layer, each of the first and second panes and of the thermoplastic intermediate layer having at least one hole;
b) arranging the first pane, the thermoplastic intermediate layer, and the second pane, areally one over another, wherein said holes of the first and second panes and of the thermoplastic intermediate layer overlap;
c) bonding the first pane to the second pane via the thermoplastic intermediate layer by lamination, wherein a composite glass pane is created and wherein a through passage is formed from said holes, said through passage having an inner surface that extends through the entire composite glass pane; and
d) providing an edge of the through passage with a polymeric element formed in one piece, wherein the polymeric element is arranged on the entire inner surface edge of the through passage.

16. The method according to claim 15, wherein, in step d), a region of the composite glass pane with the through passage is arranged between two injection molds and the polymeric element is molded directly onto the edge of the through passage.

17. The method according to claim 15, wherein in step (d), a tolerance ring is inserted into the through passage as the polymeric element.

* * * * *

UNITED STATES PATENT AND TRADEMARK OFFICE
CERTIFICATE OF CORRECTION

PATENT NO. : 10,773,485 B2
APPLICATION NO. : 15/736282
DATED : September 15, 2020
INVENTOR(S) : Stefan Uebelacker et al.

Page 1 of 2

It is certified that error appears in the above-identified patent and that said Letters Patent is hereby corrected as shown below:

In the Claims

Claim 1 should read:
1. A composite glass pane with a through mounting hole, comprising:
    a first pane;
    a second pane;
    a thermoplastic intermediate layer, bonding the first pane to the second pane; and a passage having an inner surface that extends through the entire composite glass pane,
        wherein an edge of the passage includes a polymeric element, said polymeric element having a through hole running through the passage,
        wherein the polymeric element is arranged on the entire inner surface of the passage,
        wherein the entire polymeric element is formed as one piece and consists of an injection molded material,
        wherein the polymeric element overlaps the first and second panes and wherein the overlapping portion of the polymeric element with the first and second panes, in its entirety, directly contacts the first and second panes.

Claim 15 should read:
15. A method for producing a composite glass pane with a through mounting hole, comprising:
    a) providing a first pane, a second pane, and a thermoplastic intermediate layer, each of the first and second panes and of the thermoplastic intermediate layer having at least one hole;
    b) arranging the first pane, the thermoplastic intermediate layer, and the second pane, areally one over another, wherein said holes of the first and second panes and of the thermoplastic intermediate layer overlap;
    c) bonding the first pane to the second pane via the thermoplastic intermediate layer by lamination, wherein a composite glass pane is created and wherein a through passage is formed from said holes, said through passage having an inner surface that extends through the entire composite glass pane; and Signed and Sealed this
First Day of December, 2020

Andrei Iancu
*Director of the United States Patent and Trademark Office* d) providing an edge of the through passage with a polymeric element, said polymeric element having a through hole running through the through passage, wherein the polymeric element is arranged on the entire inner surface of the through passage, wherein the entire polymeric element is formed as one piece and consists of an injection molded material, wherein the polymeric element overlaps the first and second panes and wherein the overlapping portion of the polymeric element with the first and second panes, in its entirety, directly contacts the first and second panes.